United States Patent
Flynn et al.

(10) Patent No.: US 10,890,909 B2
(45) Date of Patent: Jan. 12, 2021

(54) AUTOMOBILE DRIVING MODE DETERMINATION

(71) Applicant: INTERNATIONAL BUSINESS MACHINES CORPORATION, Armonk, NY (US)

(72) Inventors: Sean P. Flynn, Medford, MA (US); Christopher Lemay, New Ipswich, NH (US); Yi Hsuan Lo, Lunenburg, MA (US); Ting Fai Wong, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 15/865,362

(22) Filed: Jan. 9, 2018

(65) Prior Publication Data
US 2019/0212731 A1    Jul. 11, 2019

(51) Int. Cl.
G05D 1/00 (2006.01)
B60W 50/14 (2020.01)
B60W 50/00 (2006.01)

(52) U.S. Cl.
CPC ........... G05D 1/0061 (2013.01); B60W 50/14 (2013.01); B60W 2050/0073 (2013.01); B60W 2050/0078 (2013.01); B60W 2552/00 (2020.02); B60W 2555/20 (2020.02)

(58) Field of Classification Search
CPC ................ G05D 1/0061; B60W 50/14; B60W 2555/20; B60W 2050/0077; B60W 2050/0089
See application file for complete search history.

(56) References Cited

U.S. PATENT DOCUMENTS

| 7,610,981 | B2 | 11/2009 | Banno et al. |
| 8,954,217 | B1 | 2/2015 | Montemerlo et al. |
| 9,098,080 | B2 | 8/2015 | Norris et al. |
| 9,442,484 | B2 | 9/2016 | Park |
| 9,494,935 | B2 * | 11/2016 | Okumura ............. B60W 30/00 |
| 9,511,779 | B2 | 12/2016 | Cullinane et al. |
| 2014/0088814 | A1 | 3/2014 | You et al. |
| 2014/0088855 | A1 | 3/2014 | Ferguson |
| 2014/0303827 | A1 | 10/2014 | Dolgov et al. |
| 2014/0325649 | A1 | 10/2014 | Zhang |
| 2016/0026180 | A1 * | 1/2016 | Tsimhoni ............. G05D 1/0061 701/23 |

(Continued)

OTHER PUBLICATIONS

Anonymous; Car built-in mechanism to enforce mandatory self-driving mode; IP.com; IPCOM000234916D; Feb. 14, 2014; 3 pages.

*Primary Examiner* — Michael J Zanelli
(74) *Attorney, Agent, or Firm* — Schmeiser, Olsen & Watts; Nicholas L. Cadmus (57) ABSTRACT

A method and system enabling an automated vehicular mode switching improvement is provided. The method includes receiving detected road conditions, weather related data, and current GPS coordinates associated with a vehicle in motion. The detected road conditions and weather related data are analyzed. In response, it is determined that the vehicle is currently operating in an autonomous driving mode and should be switched to a manual driving mode. A resulting alert is generated. The alert is presented to the user and it is determined if the vehicle has been switched to manual driving mode.

14 Claims, 3 Drawing Sheets

(56) References Cited

U.S. PATENT DOCUMENTS

| | | |
|---|---|---|
| 2016/0107655 A1 | 4/2016 | Desnoyer et al. |
| 2016/0347314 A1 | 12/2016 | Kuwahara et al. |
| 2017/0080948 A1 | 3/2017 | Lubbers et al. |
| 2018/0023966 A1* | 1/2018 | Iwai .................... G01C 21/26 701/423 |
| 2018/0074497 A1* | 3/2018 | Tsuji ................ G01C 21/3484 |

* cited by examiner

FIG. 3

AUTOMOBILE DRIVING MODE DETERMINATION

FIELD

The present invention relates generally to a method for automatically switching between driving modes of a vehicle and in particular to a method and associated system for determining conditions for transmitting a recommendation to switch between autonomous and manual driving modes of a vehicle.

BACKGROUND

Determining conditions for implementing vehicular functions typically includes an inaccurate process with little flexibility. Addressing specific functions associated with operating a vehicle may involve an unreliable process that may be time consuming and require a large amount of resources. Accordingly, there exists a need in the art to overcome at least some of the deficiencies and limitations described herein above.

SUMMARY

A first aspect of the invention an automated vehicular mode switching improvement method comprising: receiving from a vehicle in motion, by a processor of a hardware device located externally from the vehicle, detected road conditions, weather related data, traffic condition data, a current time, and current GPS coordinates associated with the vehicle in motion; analyzing, by the processor, the detected road conditions, the traffic conditions, the current time, and the weather related data; first detecting, by the processor, that the vehicle is currently operating in an autonomous driving mode; determining, by the processor in response to results of the analyzing, that the vehicle in motion should be switched to a manual driving mode; generating, by the processor based on historical data associated with previous vehicles switching to manual driving mode at the current GPS coordinates, an alert indicating that the vehicle in motion should be switched to the manual driving mode; presenting, by the processor to the user, the alert; and second detecting, by the processor, if the vehicle has been switched to the manual driving mode.

A second aspect of the invention provides a computer program product, comprising a computer readable hardware storage device storing a computer readable program code, the computer readable program code comprising an algorithm that when executed by a computer processor of a hardware device implements an automated vehicular mode switching improvement method, the method comprising: receiving from a vehicle in motion, by the processor, detected road conditions, weather related data, traffic condition data, a current time, and current GPS coordinates associated with the vehicle in motion, wherein the hardware device is located externally from the vehicle; analyzing, by the processor, the detected road conditions, the traffic conditions, the current time, and the weather related data; first detecting, by the processor, that the vehicle is currently operating in an autonomous driving mode; determining, by the processor in response to results of the analyzing, that the vehicle in motion should be switched to a manual driving mode; generating, by the processor based on historical data associated with previous vehicles switching to manual driving mode at the current GPS coordinates, an alert indicating that the vehicle in motion should be switched to the manual driving mode; presenting, by the processor to the user, the alert; and second detecting, by the processor, if the vehicle has been switched to the manual driving mode.

A third aspect of the invention provides a hardware device comprising a computer processor coupled to a computer-readable memory unit, the memory unit comprising instructions that when executed by the computer processor implements an automated vehicular mode switching improvement method comprising: receiving from a vehicle in motion, by the processor, detected road conditions, weather related data, traffic condition data, a current time, and current GPS coordinates associated with the vehicle in motion, wherein the hardware device is located externally from the vehicle; analyzing, by the processor, the detected road conditions, the traffic conditions, the current time, and the weather related data; first detecting, by the processor, that the vehicle is currently operating in an autonomous driving mode; determining, by the processor in response to results of the analyzing, that the vehicle in motion should be switched to a manual driving mode; generating, by the processor based on historical data associated with previous vehicles switching to manual driving mode at the current GPS coordinates, an alert indicating that the vehicle in motion should be switched to the manual driving mode; presenting, by the processor to the user, the alert; and second detecting, by the processor, if the vehicle has been switched to the manual driving mode.

The present invention advantageously provides a simple method and associated system capable of determining conditions for implementing vehicular functions.

DETAILED DESCRIPTION

Figure 1:
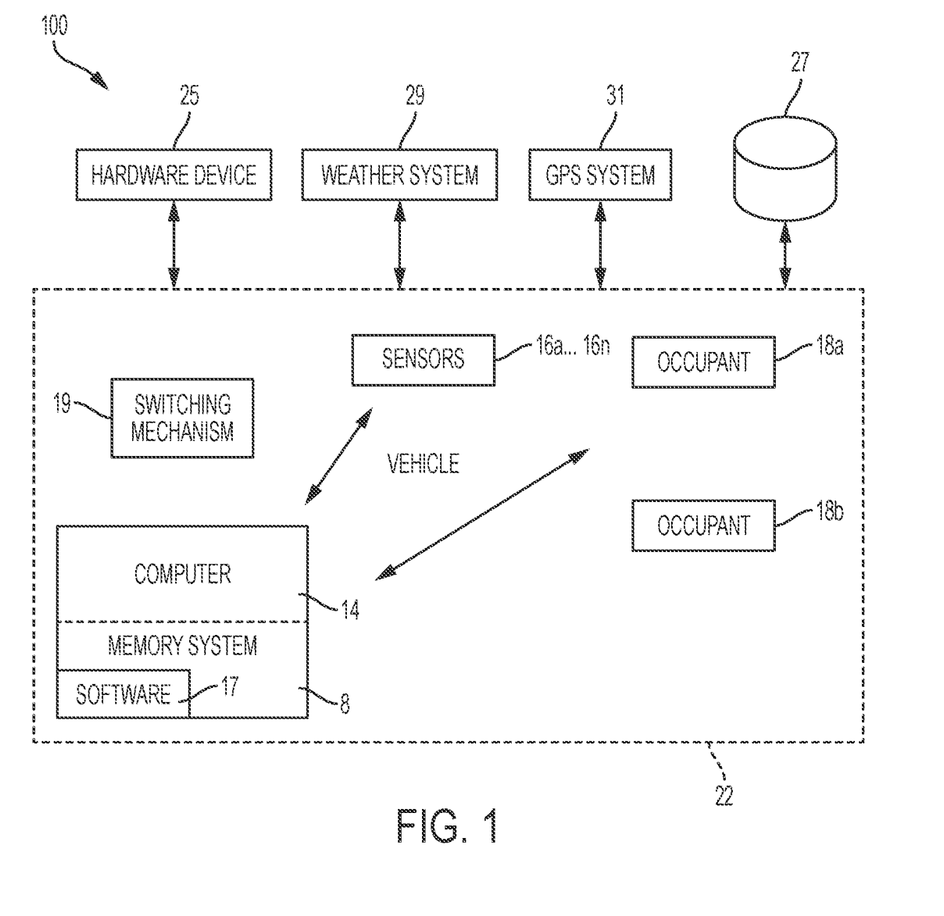
FIG. 1 illustrates a system 100 for enabling an automated vehicular mode switching improvement method, in accordance with embodiments of the present invention.

FIG. 1 illustrates a system 100 for enabling an automated vehicular mode switching improvement method, in accordance with embodiments of the present invention. System 100 is enabled to generate a recommendation to switch between autonomous and manual operation of a vehicle 22 based on vehicle 22 movement with respect to detected road conditions, weather conditions, and historic driving records for multiple vehicles operating under similar driving conditions and on a same roadway. Alternatively, system 100 may be enabled to execute a process for automatically switching between autonomous and manual operation of a vehicle 22 based on vehicle 22 movement with respect to detected road conditions, weather conditions, and historic driving records for multiple vehicles operating under similar driving conditions and on a same roadway. Driving conditions may include, inter alia, weather conditions, detected road conditions, etc.

System 100 enables a process in response to a driver (e.g., occupant 18a) determination that it is safer to operate vehicle 22 in manual mode than to operate vehicle 22 in an autonomous driving mode. For example, a driver may determine that a road comprises lane divider lines that are faded and therefore an autonomous driving mode may be difficult to execute. In response, the driver may switch to manually driven mode as he/she begins driving on the road as described in the following implementation example.

During a software learning and generation process (i.e., when the driver switches to a manual driving mode), a feedback signal (indicating the switch to a manual driving mode on a specified road) is transmitted to hardware device 25 (e.g., a central server). Additionally, metadata associated with the switch to a manual driving mode is transmitted to hardware device 25. The metadata may include data associated with the switch to a manual driving mode including, inter alia, a current location of the specified road, a current date, a current time, weather conditions, etc. During a specified timeframe (as more drivers switch from an autonomous to manual driving mode during travel on the specified road), system 100 recognizes the specified road as being associated with a high propensity for drivers switching to a manual driving mode. Therefore, when subsequent drivers approach the specified road, an automated signal is transmitted from hardware device 25 to the driver in vehicle 22. The signal is decoded (e.g., via computer 14) such that the decoded signal indicates that the driver may want to switch to manual driving mode. Additionally, hardware device 25 automatically tracks drivers switching back into an autonomous driving mode thereby generating switching recommendations to additional drivers accordingly.

System 100 of FIG. 1 includes a hardware device 25, a weather sensing system 29, a global positioning satellite (GPS) (or any type of movement detection system) system 31, and a database 27 communicatively connected (e.g., via a network) to a vehicle 22. The vehicle 22 includes an onboard computer 14, a switching mechanism 19, sensors 16a . . . 16n, and occupants 18a and 18b. Onboard computer 14 may include any type of computing system(s) including, inter alia, an automobile integrated controller computer, a computer (PC), a laptop computer, a tablet, etc. Onboard computer 14 includes a memory system 8. Memory system 8 stores program instructions 17 for determining vehicle motion and enabling an automated vehicular mode switching improvement method. Onboard computer 14 and hardware device 25 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated vehicular mode switching improvement method). Switching mechanism 19 comprises any type of electrical and/or mechanical switching mechanism (for automatically switching between driving modes) that may include proprietary specially designed electro/mechanical components (e.g., circuitry, switching relay, etc.). Sensors 16a . . . 16n may include any type of sensors for detecting road conditions, traffic conditions, a current time, weather conditions, GPS coordinates, etc. Sensors 16a . . . 16n may include, inter alia, optical sensors, temperature sensors, infrared sensors, speed sensors, GPS sensors, moisture sensors, pressure sensors, motion detector sensors, etc.

Vehicle 22 movement detection may include any type of movement detection methods (via usage of sensors 16a . . . 16n) including, inter alia, global positioning satellite (GPS) tracking/movement detection methods (including triangulation motion detection methods), micro electro-mechanical system (MEMS) methods, Wi-Fi positioning methods, a cellular tower triangulation process, etc.

MEMS methods are enabled to detect acceleration movement (i.e., via an accelerometer and a gyroscope) used to trigger requests for positioning information. Therefore, MEMS enables a process for periodically requesting a current location and comparing the current location to prior location requests thereby determining movement, direction, and speed.

A Wi-Fi positioning method comprises a localization technique (used for positioning with wireless access points) based on a process for measuring an intensity of a received signal (i.e., received signal strength in English RSS) and a process comprising finger printing. An accuracy of a Wi-Fi positioning method depends on a number of positions entered into a database.

A GPS tracking method (i.e., comprising a triangulation of geo synchronous satellites) comprises a location based service.

A cellular tower triangulation process uses a location area code (LAC) and a Cell ID of an associated cell tower currently connected to an associated cellular telephone to determine a position of the currently connected cellular telephone resulting in data usage from at least three cellular towers. The cellular tower triangulation process calculates a handset's location precisely. Each base station covers a specified geographical area.

Figure 2:
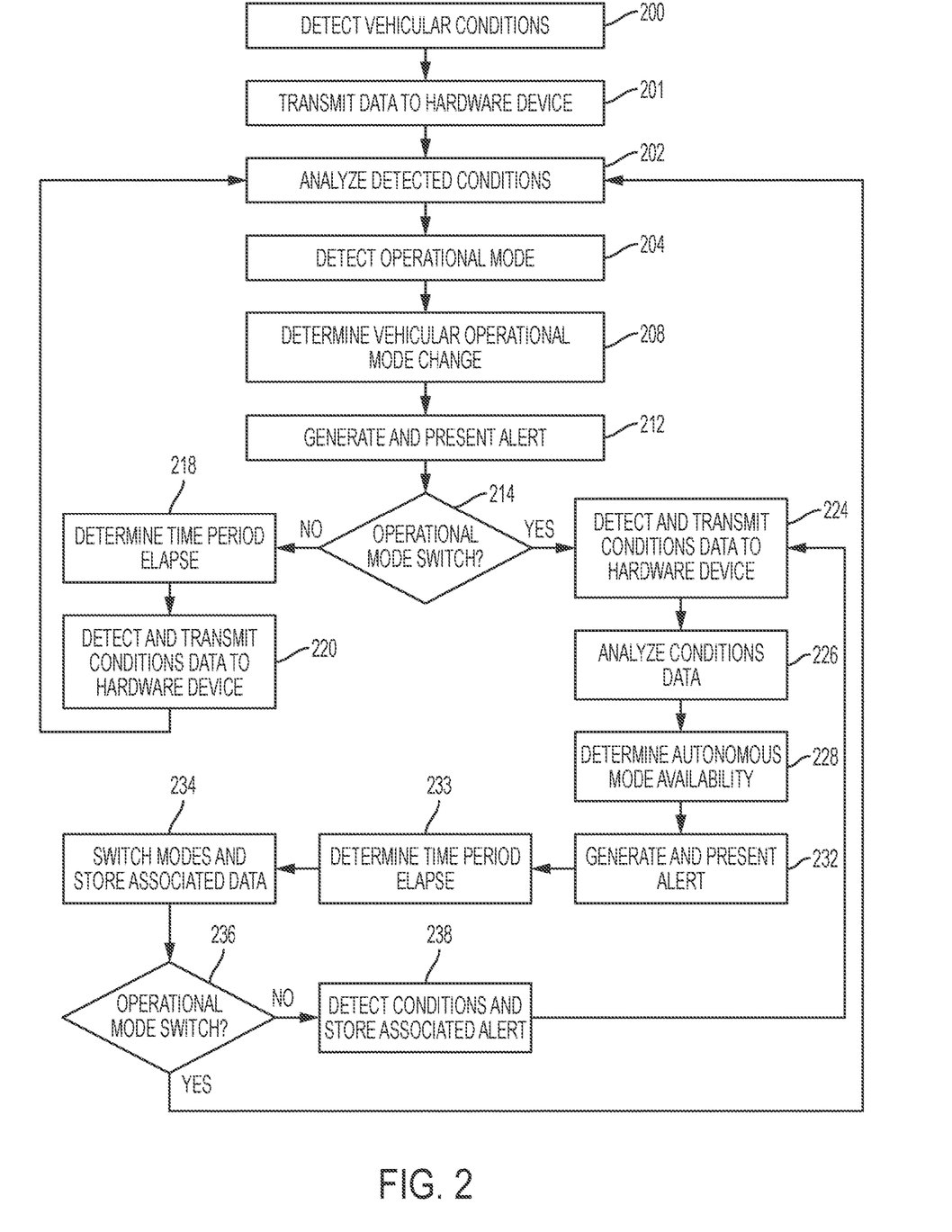
FIG. 2 illustrates a flowchart detailing a process enabled by the system of FIG. 1 for enabling an automated vehicular mode switching improvement method, in accordance with embodiments of the present invention.

FIG. 2 illustrates a flowchart detailing a process enabled by system 100 of FIG. 1 for enabling an automated vehicular mode switching improvement method, in accordance with embodiments of the present invention. Each of the steps in the algorithm of FIG. 2 may be enabled and executed in any order by a computer processor executing computer code. In step 200, detected road conditions, weather related data, and current GPS coordinates associated with a vehicle in motion are detected via sensors in the vehicle. Additionally, the weather related data may be detected via the sensors in the vehicle in combination with received weather conditions (e.g., from an external weather detection system). In step 201, the detected road conditions, weather related data, and current GPS coordinates are transmitted (from an integrated computer or hardware within the vehicle) to an external hardware device for analysis. In step 202, the detected road conditions and weather are analyzed. In step 204, the integrated computer or hardware within the vehicle detects that the vehicle is currently operating in in an autonomous driving mode. In step 208, it is determined (based on results of the analysis of step 202 in combination with historical data associated with previous vehicles switching to manual driving mode at the current GPS coordinates) that the vehicle in motion should be switched to a manual driving mode. In step 212, a resulting alert (indicating that the vehicle in motion should be switched to a manual driving mode) is generated and presented to the driver of the vehicle. In step 214, the integrated computer or hardware within the vehicle detects if the vehicle has been switched to a manual driving mode.

If in step 214 it is determined that the vehicle has not been switched to a manual driving mode then in step 218, it is determined that a specified time period has elapsed since execution of step 214. In step 220, additional road conditions, additional weather related data, and additional current GPS coordinates associated with the vehicle in motion are detected and transmitted to the external hardware device and step 202 is repeated. If in step 214 it is determined that the vehicle has been switched to a manual driving mode then in step 224, additional weather related data, and additional current GPS coordinates associated with the vehicle in motion are detected and transmitted to the external hardware device. In step 226, additional detected road conditions and additional weather related data are analyzed. In step 228, it is determined (based on results of the analysis of step 226) that an autonomous driving mode is currently available. In step 232, an additional alert indicating that the vehicle in motion will be switched from manual driving mode to autonomous driving mode is generated. The additional alert is generated based on based on historical data associated with previous vehicles switching to autonomous driving mode at the current GPS coordinates. The additional alert is presented to a driver of the vehicle. In step 233, it is determined that a specified time period has elapsed since presenting the additional alert to the driver. In step 234, the may be switched from manual driving mode to autonomous driving mode based on input from the driver. Data indicating the switch from manual driving mode to autonomous driving mode is stored in a specialized database. In step 236, the integrated computer or hardware within the vehicle detects if the vehicle has been switched to autonomous driving mode. If in step 236 it is determined that the vehicle has been switched to an autonomous driving mode then step 202 is repeated. If in step 236 it is determined that the vehicle has not been switched to an autonomous driving mode then optional step 238 is executed and step 224 is repeated. In step 238, a detection process is executed. The detection process may detect:

1. That a current speed of the vehicle exceeds a current speed limit by a specified threshold.
2. Unsafe road conditions associated with the vehicle in motion.
3. Unsafe weather conditions associated with the vehicle in motion.

Alert data indicating the aforementioned results of the detection process may be generated and stored for future analysis.

Figure 3:
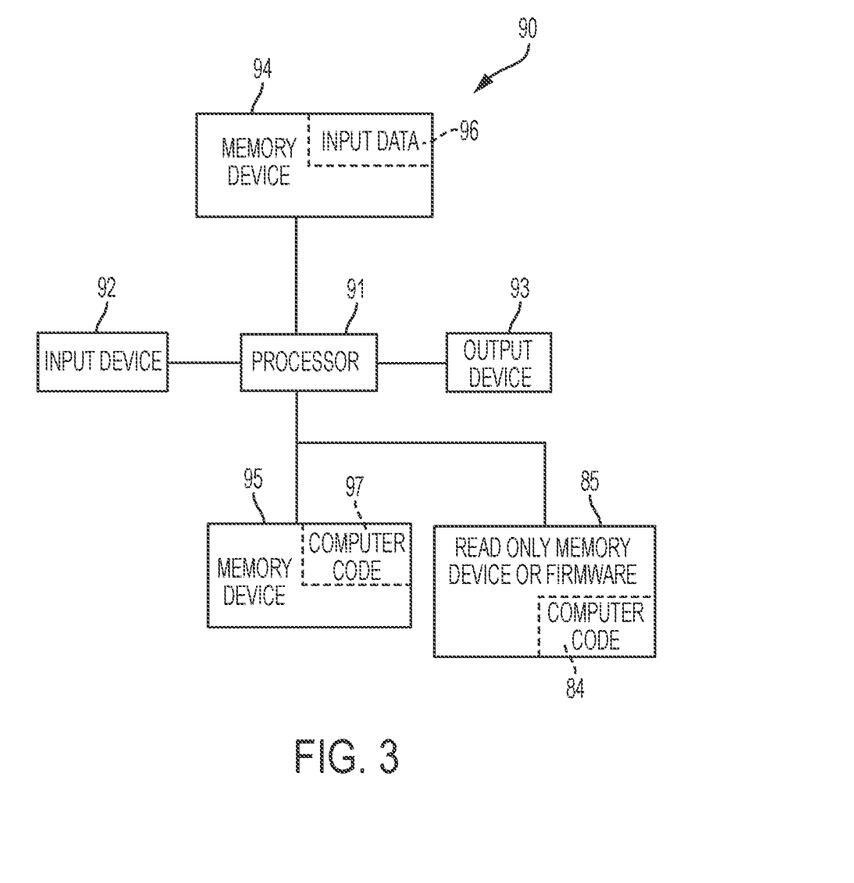
FIG. 3 illustrates a computer system for enabling an automated vehicular mode switching improvement method, in accordance with embodiments of the present invention.

FIG. 3 illustrates a computer system 90 (e.g., hardware device 25 and computer 14 for enabling an automated vehicular mode switching improvement method, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling an automated vehicular mode switching improvement method. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable an automated vehicular mode switching improvement method. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling an automated vehicular mode switching improvement method. In another embodiment, the invention provides a business method that performs the process steps of the invention on a subscription, advertising, and/or fee basis. That is, a service supplier, such as a Solution Integrator, could offer to enable an automated vehicular mode switching improvement method. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated vehicular mode switching improvement method comprising:
   receiving from a vehicle in motion, by a processor of a hardware device located externally from said vehicle, detected road conditions, traffic condition data, a current time, weather related data, and current GPS coordinates associated with said vehicle in motion;
   analyzing, by said processor, said detected road conditions, the traffic condition data, the current time and said weather related data;

first receiving, by said processor, an indication that said vehicle is currently operating in an autonomous driving mode;

receiving, by said processor, historical driving mode switching data associated with road conditions similar to said detected road conditions;

determining, by said processor in response to results of said analyzing and based on said historical driving mode switching data associated with the road conditions, that said vehicle in motion should be switched to a manual driving mode;

generating, by said processor based on historical data associated with previous vehicles switching to manual driving mode at said current GPS coordinates, an alert indicating that said vehicle in motion should be switched to said manual driving mode;

presenting, by said processor to a driver of said vehicle, said alert;

second receiving, by said processor, a notification indicating if said vehicle has been switched to said manual driving mode;

recording, by said processor, a decision executed by the driver with respect to switching to said manual driving mode, wherein results of said second receiving indicates that said vehicle has been switched to said manual driving mode;

receiving from said vehicle in motion, by said processor, additional detected road conditions, additional weather related data, and additional current GPS coordinates associated with said vehicle in motion;

analyzing, by said processor, said additional detected road conditions and said additional weather related data;

determining, by said processor in response to results of said analyzing said additional detected road conditions and said additional weather related data, that said autonomous driving mode is currently available;

generating, by said processor based on said historical data associated with previous vehicles switching to autonomous driving mode at said current GPS coordinates, an additional alert indicating that said vehicle in motion will be switched from said manual driving mode to said autonomous driving mode;

presenting, by said processor to said user, said additional alert;

determining, by said processor, that a specified time period has elapsed since said presenting said additional alert;

receiving, by said processor, indication data specifying that said vehicle has been switched to said autonomous driving mode; and recording, by said processor, a decision executed by the driver with respect to switching to said autonomous driving mode.

2. The method of claim 1, further comprising:
storing by said processor within a specialized database, data indicating that said vehicle has been switched to said autonomous driving mode.

3. The method of claim 1, further comprising:
receiving, by said processor, indication data specifying that a current speed of said vehicle exceeds a current speed limit by a specified threshold; and
automatically storing, by said processor within a database of said hardware device, alert data indicating that said current speed exceeds said current speed limit by said specified threshold.

4. The method of claim 1, further comprising:
receiving, by said processor, indication data specifying unsafe road conditions associated with said vehicle in motion; and
automatically storing, by said processor within a database of said hardware device, alert data indicating said unsafe road conditions associated with said vehicle in motion.

5. The method of claim 1, further comprising:
receiving, by said processor, indication data specifying unsafe weather conditions associated with said vehicle in motion; and
automatically storing, by said processor within a database of said hardware device, alert data indicating said unsafe weather conditions associated with said vehicle in motion.

6. The method of claim 1, further comprising:
providing at least one support service for at least one of creating, integrating, hosting, maintaining, and deploying computer-readable code in the hardware device, said code being executed by the processor to implement: said receiving, said analyzing, said first receiving, said determining, said generating, said presenting, and said second receiving.

7. A computer program product, comprising a computer readable hardware storage device storing a computer readable program code, said computer readable program code comprising an algorithm that when executed by a computer processor of a hardware device implements an automated vehicular mode switching improvement method, said method comprising:

receiving from a vehicle in motion, by said processor, detected road conditions, traffic condition data, a current time, weather related data, and current GPS coordinates associated with said vehicle in motion;

analyzing, by said processor, said detected road conditions, the traffic condition data, the current time, and said weather related data;

first receiving, by said processor, an indication that said vehicle is currently operating in an autonomous driving mode;

receiving, by said processor, historical driving mode switching data associated with road conditions similar to said detected road conditions;

determining, by said processor in response to results of said analyzing and based on said historical driving mode switching data associated with the road conditions, that said vehicle in motion should be switched to a manual driving mode;

generating, by said processor based on historical data associated with previous vehicles switching to manual driving mode at said current GPS coordinates, an alert indicating that said vehicle in motion should be switched to said manual driving mode;

presenting, by said processor to a driver of said vehicle, said alert;

second receiving, by said processor, a notification indicating if said vehicle has been switched to said manual driving mode;

recording, by said processor, a decision executed by the driver with respect to switching to said manual driving mode, wherein results of said second receiving indicates that said vehicle has been switched to said manual driving mode;

receiving from said vehicle in motion, by said processor, additional detected road conditions, additional weather related data, and additional current GPS coordinates associated with said vehicle in motion;

analyzing, by said processor, said additional detected road conditions and said additional weather related data;

determining, by said processor in response to results of said analyzing said additional detected road conditions and said additional weather related data, that said autonomous driving mode is currently available;

generating, by said processor based on said historical data associated with previous vehicles switching to autonomous driving mode at said current GPS coordinates, an additional alert indicating that said vehicle in motion will be switched from said manual driving mode to said autonomous driving mode;

presenting, by said processor to said user, said additional alert;

determining, by said processor, that a specified time period has elapsed since said presenting said additional alert;

receiving, by said processor, indication data specifying that said vehicle has been switched to said autonomous driving mode; and recording, by said processor, a decision executed by the driver with respect to switching to said autonomous driving mode.

8. The computer program product of claim 7, wherein said method further comprises:
storing by said processor within a specialized database, data indicating that said vehicle has been switched to said autonomous driving mode.

9. The computer program product of claim 7, wherein said method further comprises:
receiving, by said processor, indication data specifying that a current speed of said vehicle exceeds a current speed limit by a specified threshold; and
automatically storing, by said processor within a database of said hardware device, alert data indicating that said current speed exceeds said current speed limit by said specified threshold.

10. The computer program product of claim 7, wherein said method further comprises:
receiving, by said processor, indication data specifying unsafe road conditions associated with said vehicle in motion; and
automatically storing, by said processor within a database of said hardware device, alert data indicating said unsafe road conditions associated with said vehicle in motion.

11. The computer program product of claim 7, wherein said method further comprises:
receiving, by said processor, indication data specifying unsafe weather conditions associated with said vehicle in motion; and
automatically storing, by said processor within a database of said hardware device, alert data indicating said unsafe weather conditions associated with said vehicle in motion.

12. A hardware device comprising a computer processor coupled to a computer-readable memory unit, said memory unit comprising instructions that when executed by the computer processor implements an automated vehicular mode switching improvement method comprising:
receiving from a vehicle in motion, by said processor, detected road conditions, traffic condition data, a current time, weather related data, and current GPS coordinates associated with said vehicle in motion;

analyzing, by said processor, said detected road conditions, the traffic condition data, the current time and said weather related data;

first receiving, by said processor, an indication that said vehicle is currently operating in an autonomous driving mode;

receiving, by said processor, historical driving mode switching data associated with road conditions similar to said detected road conditions;

determining, by said processor in response to results of said analyzing and based on said historical driving mode switching data associated with the road conditions, that said vehicle in motion should be switched to a manual driving mode;

generating, by said processor based on historical data associated with previous vehicles switching to manual driving mode at said current GPS coordinates, an alert indicating that said vehicle in motion should be switched to said manual driving mode;

presenting, by said processor to a driver of said vehicle, said alert;

second receiving, by said processor, a notification indicating if said vehicle has been switched to said manual driving mode;

recording, by said processor, a decision executed by the driver with respect to switching to said manual driving mode, wherein results of said second receiving indicates that said vehicle has been switched to said manual driving mode;

receiving from said vehicle in motion, by said processor, additional detected road conditions, additional weather related data, and additional current GPS coordinates associated with said vehicle in motion;

analyzing, by said processor, said additional detected road conditions and said additional weather related data;

determining, by said processor in response to results of said analyzing said additional detected road conditions and said additional weather related data, that said autonomous driving mode is currently available;

generating, by said processor based on said historical data associated with previous vehicles switching to autonomous driving mode at said current GPS coordinates, an additional alert indicating that said vehicle in motion will be switched from said manual driving mode to said autonomous driving mode;

presenting, by said processor to said user, said additional alert;

determining, by said processor, that a specified time period has elapsed since said presenting said additional alert;

receiving, by said processor, indication data specifying that said vehicle has been switched to said autonomous driving mode; and recording, by said processor, a decision executed by the driver with respect to switching to said autonomous driving mode.

13. The hardware device of claim 12, wherein said method further comprises:
storing by said processor within a specialized database, data indicating that said vehicle has been switched to said autonomous driving mode.

14. The hardware device of claim 12, wherein said method further comprises:
receiving, by said processor, indication data specifying that a current speed of said vehicle exceeds a current speed limit by a specified threshold; and automatically storing, by said processor within a database of said hardware device, alert data indicating that said current speed exceeds said current speed limit by said specified threshold.

\* \* \* \* \*